(12) United States Patent
Wei et al.

(10) Patent No.: US 10,345,575 B1
(45) Date of Patent: Jul. 9, 2019

(54) GLOBAL RESET FOR AN ELECTROWETTING DISPLAY DEVICE

(71) Applicant: Amazon Technologies, Inc., Seattle, WA (US)

(72) Inventors: Jack Shih-Chieh Wei, Saratoga, CA (US); Siddharth Gupta, San Bruno, CA (US); Robert Waverly Zehner, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/553,620

(22) Filed: Nov. 25, 2014

(51) Int. Cl.
*G02B 26/00* (2006.01)
*G09G 3/34* (2006.01)

(52) U.S. Cl.
CPC .......... *G02B 26/005* (2013.01); *G09G 3/348* (2013.01); *G09G 2300/0809* (2013.01); *G09G 2310/061* (2013.01)

(58) Field of Classification Search
CPC ..... G09G 3/348; G09G 3/3639; G02B 26/005
See application file for complete search history.

(56) References Cited

U.S. PATENT DOCUMENTS

| 2008/0224970 | A1* | 9/2008 | Van Den Biggelaar ..... G09G 3/348 345/84 |
| 2011/0148948 | A1* | 6/2011 | Gandhi ............ G02B 26/001 345/690 |
| 2013/0009938 | A1* | 1/2013 | Hwang ............. G09G 3/348 345/212 |
| 2013/0222355 | A1* | 8/2013 | Choi ................ G09G 3/348 345/211 |
| 2014/0300594 | A1* | 10/2014 | Aubert ............. G09G 3/348 345/212 |

* cited by examiner

*Primary Examiner* — Kenneth Bukowski
(74) *Attorney, Agent, or Firm* — EIP US LLP

(57) ABSTRACT

An electrowetting display device comprises electrowetting pixels. Each of the electrowetting pixels includes a hydrophobic layer portion disposed on a first electrode, an electrolyte solution overlying the hydrophobic layer, and a thin film transistor (TFT) that is switched on to select each of the electrowetting pixels using active matrix addressing, wherein the TFT is in electrical contact with the first electrode. The electrowetting display further includes a second electrode in electrical contact with the electrowetting pixels, and a reset control circuit in electrical contact with the second electrode to provide a reset pulse in unison to the electrowetting pixels.

20 Claims, 4 Drawing Sheets

GLOBAL RESET FOR AN ELECTROWETTING DISPLAY DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
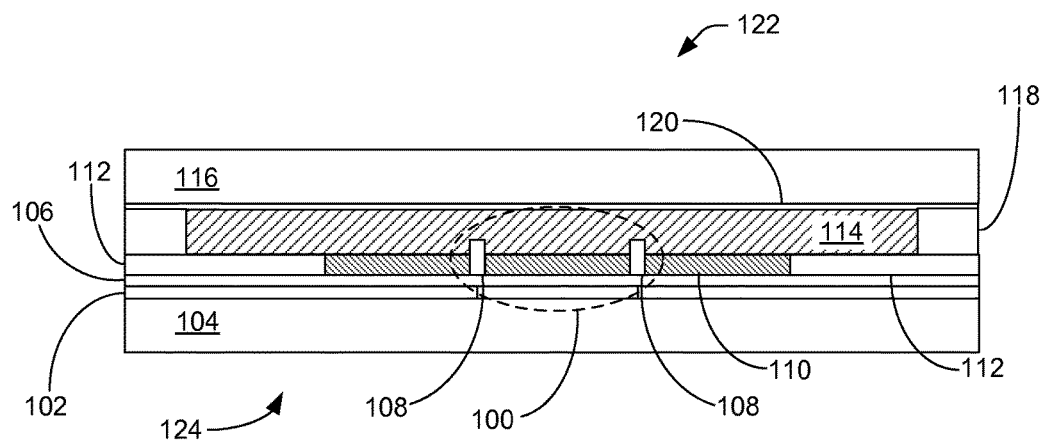
FIG. 1 illustrates a cross-section of a portion of an electrowetting display device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for assembling electronic devices including these components for the electrowetting displays and other features described herein.

In some embodiments, an electrowetting display device includes a bottom support plate and a top support plate and a plurality of pixels therebetween. Individual pixels may include a hydrophobic layer or surface on the bottom support plate, a first fluid on the hydrophobic layer, and a second fluid at least partially surrounding the first fluid. For example, the first fluid may be an electrowetting oil and the second fluid may be an electrolyte solution. The hydrophobic layer may comprise a hydrophobic amorphous fluoropolymer (AF), for example. While each pixel may include a bottom electrode disposed on the bottom plate, a single top electrode may cover a plurality of the pixels. Herein, "disposed on" includes the possibility of intermediate layers (e.g., "disposed on" need not mean "directly on").

Herein, the term "hydrophobic" is used to describe a material or layer that is hydrophobic relative to other materials or layers. For example, a hydrophobic layer need not be 100% hydrophobic, though the hydrophobicity of the layer may be relatively high. Hydrophobicity of a "hydrophobic material" or "hydrophobic layer" may change under various circumstances or conditions.

The electrowetting display device may also include a control circuit to globally provide a reset pulse to the plurality of pixels via the top electrode layer. Such a reset pulse may be applied to the electrowetting pixels to reduce adverse effects on the quality (e.g., brightness, contrast ratio, and so on) of an image displayed by the pixels resulting from electrowetting fluid backflow. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light to transmit through (or reflect from) the electrowetting pixel. Even though a first signal level corresponding to the first display state is applied to the electrowetting element during this period, the contracted or partially contracted first fluid tends to flow back to form a layer over the bottom electrode layer of the pixel, as in the case of an inactive state that prevents light from transmitting through (or reflecting from) the electrowetting pixel. The rate of backflow depends, at least in part, on the properties of the first fluid. Backflow leads to an undesirable change in the display state of the electrowetting pixel and, consequently, a reduced quality of the image of the display device.

The application of a reset pulse during the display period of the first display state resets the electrowetting pixel to counteract backflow. Since the reset pulse may affect the instantaneous display state of an electrowetting pixel, the duration of the reset pulse is relatively short compared to the duration of the first signal level corresponding to the first display state. For example, the reset pulse may have a duration short enough so as to not be noticeable to a viewer of the display device.

Though applying reset pulses can benefit the performance of an electrowetting display device, such reset pulses consume extra electrical power as compared to an electrowetting display device that operates without reset pulse. Also, applying reset pulses to a plurality of electrowetting pixels may involve electrical lines (e.g., conductive traces of a semiconductor circuit) dedicated to providing the reset pulses to the electrowetting pixels.

In various embodiments, an electrowetting display device is configured to provide a global reset pulse to the electrowetting pixels of the electrowetting display device. In other words, the global reset pulse is applied to substantially all the electrowetting pixels at the same time. Applying a global reset pulse in unison to the electrowetting pixels of a display may consume less electrical power as compared to the case where reset pulses are applied sequentially to the electrowetting pixels.

In a number of embodiments, a display device, such as an electrowetting display device, may be a transmissive, reflective or transflective display that generally includes an array of pixels (e.g., or subpixels) configured to be operated by an active matrix addressing scheme. For example, rows and columns of electrowetting elements are operated by controlling voltage levels on a plurality of data lines and gate lines. In this fashion, the display device may produce an image by selecting particular pixels to transmit, reflect or block light. Pixels may be addressed (e.g., selected) via rows and columns of the data lines and gate lines that are electrically connected to transistors (e.g., used as switches) included in each pixel. Transistors take up a relatively small fraction of the area of each pixel to allow light to efficiently pass through (or reflect from) the pixel. Herein, a pixel may, unless otherwise specified, comprise a pixel or subpixel of an electrowetting display device. Such a pixel or subpixel may be the smallest light transmissive, reflective or transflective element of a display that is individually operable to directly control an amount of light transmission through or reflection from the element. For example, in some implementations, a pixel may be a pixel that includes a red subpixel, a green subpixel, and a blue subpixel. In other implementations, a pixel may be a pixel that is a smallest component, e.g., the pixel does not include any subpixels.

Electrowetting display devices may include an array of pixels comprising single pixels and/or subpixels sandwiched between two support plates, such as a bottom plate and a top plate. For example, a bottom support plate in cooperation with a top support plate may contain pixels that include electrowetting oil, electrolyte solution and pixel walls between the support plates. Support plates may include glass, plastic (e.g., a transparent thermoplastic such as PMMA or other acrylic), or other transparent material and may be made of a rigid or flexible material, for example.

Hereinafter, example embodiments include reflective electrowetting displays that include a clear top support plate and a bottom support plate, which need not be transparent. The clear top support plate may comprise glass or any of a number of transparent materials, such as plastic, quartz, semiconductors, and so on, and claimed subject matter is not limited in this respect. "Top" and "bottom", as used herein to identify the support plates of an electrowetting display, do not necessarily refer to a direction referenced to gravity or to a viewing side of the electrowetting display. Also, as used herein for sake of convenience of describing example embodiments, the top support plate is that through which viewing of pixels of a (reflective) electrowetting display occurs.

As mentioned above, a bottom support plate may be opaque while the top support plate is transparent. Herein, describing an element or material as being "transparent" means that the element or material may transmit a relatively large fraction of the light incident upon it. For example, a transparent substrate, support plate, or layer may transmit more than 70% or 80% of the light impinging on its surface, though claimed subject matter is not limited in this respect.

Pixel walls retain at least a first fluid which is electrically non-conductive, such as opaque or colored oil, in the individual pixels. A cavity formed between the support plates is filled with the first fluid (e.g., retained by pixel walls) and a second fluid (e.g., considered to be an electrolyte solution) that is electrically conductive or polar and may be a water solution or a salt solution, such as a solution of potassium chloride water. The second fluid may be transparent, but may be colored, or light-absorbing. The second fluid may be immiscible with the first fluid.

In some embodiments, individual reflective electrowetting pixels may include a reflective layer on the bottom support plate of the electrowetting pixel, a transparent electrode layer adjacent to the reflective layer, and a hydrophobic layer on the electrode layer. Pixel walls of each pixel, the hydrophobic layer, and the transparent top support plate at least partially enclose a liquid region that includes an electrolyte solution and an opaque liquid, which is immiscible with the electrolyte solution. An "opaque" liquid, as described herein, is used to describe a liquid that appears black to an observer. For example, an opaque liquid strongly absorbs a broad spectrum of wavelengths (e.g., including those of red, green and blue) in the visible region of electromagnetic radiation. In some implementations, the opaque liquid is a nonpolar electrowetting oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

In addition to pixels, spacers and edge seals may also be located between two support plates. Support plates may comprise any of a number of amorphous materials, such as plastic, glass, quartz, semiconductors, and so on, and claimed subject matter is not limited in this respect.

Spacers and edge seals which mechanically connect a first support plate with a second overlying support plate, or which form a separation between the first support plate and the second support plate, contribute to mechanical integrity of the electrowetting display. Edge seals, for example, being disposed along a periphery of an array of electrowetting display device elements, may contribute to retaining (e.g., first and second) fluids between the first support plate and the second overlying support plate. Spacers are desirably transparent so as to not hinder throughput of light in the electrowetting display. Transparency of spacers may at least partially depend on the refractive index of the spacer material, which may be similar to or the same as the refractive indices of surrounding media. Spacers are also desirably chemically inert to surrounding media.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient room light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a bottom support plate 104. Electrode layer 102 may be partitioned to include a number of electrodes individually corresponding to an electrowetting pixel 100. In other words, each electrowetting pixel 100 may include an electrode.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over a (non-conducting) support plate, which may be glass or any of a number of other transparent or non-transparent materials, for example. Conductive traces on the support plate, which may interconnect a number of TFTs, may comprise a metal or other electrical conductor.

In some implementations, a dielectric barrier layer (not illustrated in FIG. 1) may at least partially separate electrode layer 102 from an AF layer 106 also formed on bottom support plate 104. Such separation may, among other things, prevent electrolysis occurring through AF layer 106. In some implementations, AF layer 106 may comprise any of a number of types of amorphous fluoropolymers, such as AF1600, produced by DuPont, based in Wilmington, Del. AF layer 106 may also be any of a number of water-repelling materials that affect wettability of an adjacent material, for example.

Pixel walls 108 form a patterned electrowetting element grid on AF layer 106. Pixel walls 108 may comprise a photoresist material such as, for example, epoxy-based negative photoresist SU-8. The patterned electrowetting element grid comprises rows and columns that form an array of electrowetting pixels. For example, an electrowetting pixel, which need not be square, may have a width and length in a range of about 50 to 500 microns.

A first fluid 110, which may have a thickness (e.g., depth) in a range of about 1 to 10 microns, for example, overlies AF layer 106. First fluid 110 is partitioned by pixel walls 108 of the patterned electrowetting element grid. An outer rim 112 may comprise the same material as pixel walls 108. A second fluid 114, such as an electrolyte solution, overlays first fluid 110 and pixel walls 108 of the patterned electrowetting element grid. An electrolyte solution may be electrically conductive and/or polar. For example, an electrolyte solution may be, among other things, a salt solution such as potassium chloride water. First fluid 110 may be immiscible with second fluid 114.

A top support plate 116 covers second fluid 114 and edge seals 118 maintain second fluid 114 over the electrowetting pixel array. Top support plate 116 may be supported by edge seals 118 and spacers (not illustrated) that extend up to top support plate 116 and are interspersed throughout the array of pixels 100. The top support plate may be made of glass or polymer and may be rigid or flexible, for example. In some implementations, TFTs (not shown) are fabricated onto top support plate 116. A region of electrowetting pixel 100 between top support plate 116 and bottom support plate 104 may be referred to as a pixel region.

A top electrode 120 may be disposed on top support plate 116 and in electrical contact with second fluid 114. Top electrode 120, which may comprise transparent tin-doped indium-oxide (ITO), may be shared among a plurality of electrowetting pixels 100. For example, an electrical charge placed on top electrode 120 may globally affect all electrowetting pixels 100. On the other hand, an electrical charge placed on electrode 102 of an individual electrowetting pixel 100 need not affect any other electrowetting pixels 100.

A voltage may be applied across, among other things, second fluid 114 and AF layer 106 of individual electrowetting pixels between electrode 102 and top electrode 120. Such a voltage may control transmittance or reflectance of the individual electrowetting pixels.

The reflective electrowetting display device has a viewing side 122 on which an image formed by the electrowetting display device may be viewed, and a rear side 124. Top support plate 116 faces viewing side 122 and bottom support plate 104 faces rear side 124. The reflective electrowetting display device may be a segmented display type in which the image is built up of segments. The segments may be switched simultaneously or separately. Each segment includes one electrowetting pixel 100 or a number of electrowetting pixels 100 that may be neighboring or distant from one another. Electrowetting pixels 100 included in one segment are switched simultaneously, for example. The electrowetting display device may also be an active matrix driven display type or a passive matrix driven display, just to name a few examples.

As mentioned above, second fluid 114 may be immiscible with first fluid 110. Herein, substances are immiscible with one another if the substances do not substantially form a solution. Second fluid 114 is electrically conductive and/or polar, and may be water or a salt solution such as a solution of potassium chloride in a mixture of water and ethyl alcohol, for example. Second fluid 114 is preferably transparent, but may be colored or absorbing. First fluid 110 is electrically non-conductive and may for instance be an alkane like hexadecane or (silicone) oil.

AF layer 106 is arranged on bottom support plate 104 to create an electrowetting surface area. The hydrophobic character causes first fluid 110 to adhere preferentially to bottom support plate 104 since first fluid 110 has a higher wettability with respect to the surface of AF layer 106 than second fluid 114. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 110 absorbs at least a part of the optical spectrum. First fluid 110 may be transmissive for a part of the optical spectrum, forming a color filter. For this purpose, the fluid may be colored by addition of pigment particles or dye, for example. Alternatively, first fluid 110 may be black (e.g., absorbing substantially all parts of the optical spectrum) or reflecting. Hydrophobic layer 106 may be transparent or reflective. A reflective layer may reflect the entire visible spectrum, making the layer appear white, or part of it, making it have a color.

If a voltage is applied across electrowetting pixel 100, electrowetting pixel 100 will enter into an active state. Electrostatic forces will move second fluid 114 toward electrode layer 102, thereby displacing first fluid 110 from the area of AF layer 106 to pixel walls 108 surrounding the area of AF layer 106, to a droplet-like form. Such displacing action uncovers first fluid 110 from the surface of AF layer 106 of electrowetting pixel 100.

If the voltage across electrowetting pixel 100 is returned to an inactive signal level of zero or a value near to zero, electrowetting pixel 100 will return to an inactive state, where first fluid 110 flows back to cover AF layer 106. In this way, first fluid 110 forms an electrically controllable optical switch in each electrowetting pixel 100. Of course, such details of an electrowetting display device are merely examples, and claimed subject matter is not limited in this respect.

Figure 2:
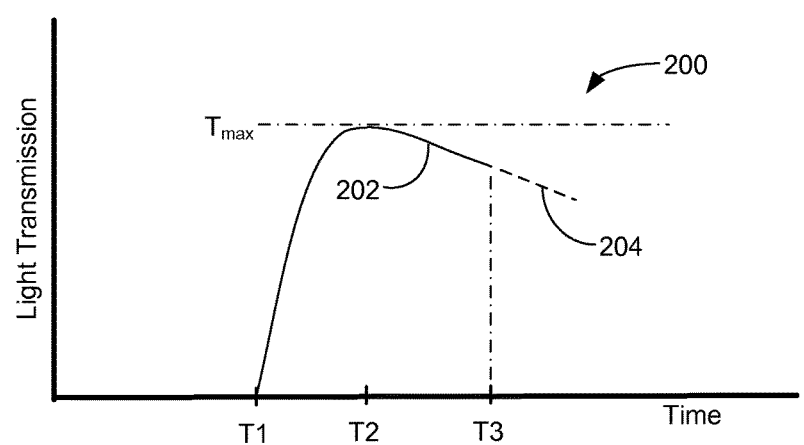
FIG. 2 is a plot of light transmission of an electrowetting element as a function of time, according to various embodiments.

FIG. 2 is a plot 200 of light transmission of electrowetting element 100 as a function of time, according to various embodiments. Though transmission is discussed, electrowetting element 100 may be incorporated in a transmissive or reflective type of electrowetting display. Here, transmission refers to the amount of light that arrives at hydrophobic layer 106, wherein the light may subsequently be reflected from a layer underlying hydrophobic layer 106 or may be transmitted through the underlying layers and bottom support plate 104, for example.

Figure 3:
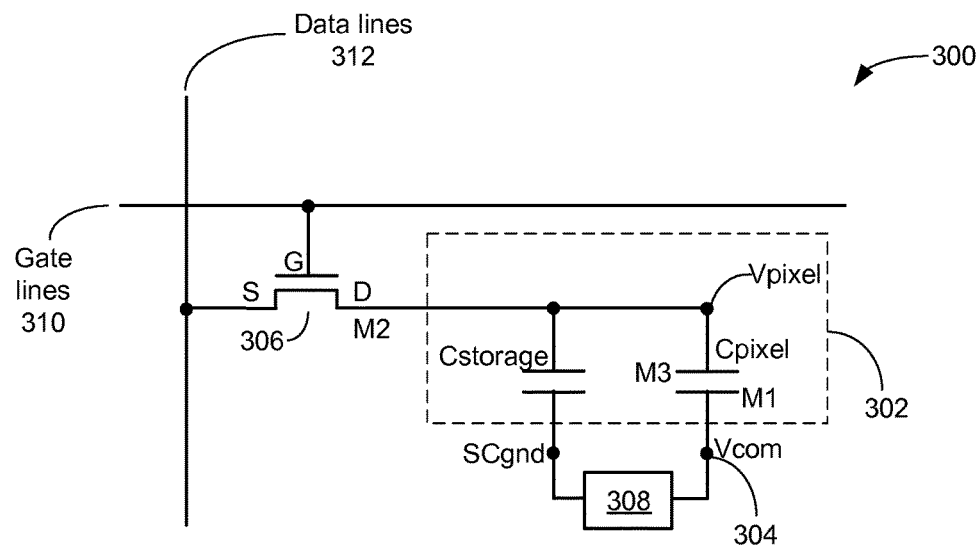
FIG. 3 is a schematic circuit diagram of a circuit of an electrowetting pixel, according to various embodiments.

Plot 200 demonstrates how backflow of first fluid 110 can affect light transmission through electrowetting element 100. In a first display period, before time T1, a voltage V applied between electrode 102 and top electrode 120 is zero, electrowetting element 100 is in an inactive state, and the light transmission is zero. At time T1, a voltage V applied between electrode 102 and top electrode 120 is set at a non-zero active signal level so that electrowetting element 100 will enter into an active state. For example, voltage V may be the voltage of the drain of a TFT 306, as shown in FIG. 3. Electrostatic forces move second fluid 114 toward electrode layer 102 and first fluid 110 is consequently repelled from the area of hydrophobic layer 106 to pixel walls 108 surrounding the area of hydrophobic layer 106, to a droplet-like form. Thus, first fluid 110 uncovers the surface of hydrophobic layer 106 and light transmission rapidly increases to a transmission level $T_{max}$ at time T2.

During or after the application of voltage V, first fluid 110 will gradually flow back to increasingly cover hydrophobic layer 106, thereby reducing light transmission of electrowetting element 100. The decrease in light transmission due to backflow is indicated by the down-slope portion 202 in plot 200. Portion 202, and thus light transmission, continues to decrease over time. At time T3, a reset pulse is applied to counteract the effects of backflow. The reset pulse momentarily suspends backflow and induces first fluid motion over the pixel area. After the reset pulse, the data voltage for a corresponding grey level can be applied to the pixel for the duration of the display period. Reset pulses are sufficiently short so as not to produce flicker for an observer of the image of the electrowetting display. Subsequently, light transmission may increase back to $T_{max}$.

In contrast, without the reset pulse the transmission of the element would have followed the slanting dashed line 204 in plot 200. Although effects of a reset pulse are explained with reference to an electrowetting element operating in transmission, a similar explanation can be given for an electrowetting element operating in reflection, whereby the display state of the element is not represented by transmission but by reflection.

In some particular embodiments, the duration of a reset pulse may be in a range from about 0.7 milliseconds up to about 1 millisecond, and the duration of a display period may be about 20 milliseconds. A reset pulse can reduce effects of backflow to such an extent that an observer need not perceive these effects. As mentioned above, reset pulses are sufficiently short so as not to produce flicker for an observer of the image of the electrowetting display.

FIG. 3 is a schematic circuit diagram of a circuit 300 of an electrowetting element of a display device, according to various embodiments. Circuit 300 includes a pixel portion 302 that includes the optical portion of electrowetting element 300. Here, referring to the example embodiment shown in FIG. 1, for example, such an optical portion includes first and second fluids 110 and 114, and portions of electrode 102 and top electrode 120. An electrical representation of the optical portion is shown in pixel portion 302. For example, capacitance Cpixel represents a capacitance formed by a multiple dielectric layer stack between two electrodes (e.g., electrode 102 and top electrode 120) of pixel portion 302. Cstorage represents a storage capacitor included in pixel portion 302. Vpixel is the voltage of pixel portion with respect to a common voltage "point", Vcom 304 (though a portion of the electrowetting element at the common voltage may be an extended region and need not be a point). For example, Vcom 304 may be the same as top electrode 120. In some implementations, Vpixel is also the voltage of the drain of TFT 306, which is used, among other things, to select electrowetting element 300 from an array of rows and columns of such electrowetting elements.

In some embodiments, pixel portion 302 may include three conductive layers which may, for example, be metal or a conductive semiconductor material. The three conductive layers are referred to as M1, M2, and M3, respectively. M1 may comprise a conductive layer in top support plate 116 of pixel portion 302. M2 may comprise a first conductive layer in bottom support plate 104 of pixel portion 302, and M3 may comprise a second conductive layer in bottom support plate 104. M1 may be connected to top electrode 120 on top support plate 116 of the electrowetting display device. In some implementations, top electrode 120 need not comprise a continuous layer and instead may comprise a conductive ring on top support plate 116. M2 may be connected to the drain of TFT 306. M3 may comprise a reflective layer such as, for example, electrode layer 102 connected to TFT 306.

In some embodiments, pixel portion 302 is electrically connected to a reset controller 308. For example, a top electrode, such as top electrode 120 illustrated in FIG. 1 may be electrically connected to reset controller 308 at Vcom. A bottom electrode (e.g., a portion of a TFT on a bottom support plate), such as a portion of electrode layer 102 illustrated in FIG. 1, includes storage capacitor Cstorage. A ground voltage point of Cstorage, SCgnd may be electrically connected to reset controller 308. During a situation when no reset pulse is present, VCOM and SCgnd may be electrically connected to each other and may be at the same electrical potential. On the other hand, if reset controller 308 is activated to generate a reset pulse, the electrical connection between VCOM and SCgnd is broken and the reset pulse may be applied across VCOM and SCgnd.

The display device includes rows of gate lines 310 for selecting particular electrowetting elements and columns of data lines 312 for electrically driving the selected electrowetting elements. Gate lines 310 and data lines 312 may comprise conductive traces on a support plate (e.g., bottom support plate 104). Gate line 310 is electrically connected to the gate of data TFT 306 to select or deselect electrowetting element 300. Data line 312 is electrically connected to the source of data TFT 306. The drain of TFT 306 is electrically connected to pixel portion 302. In other implementations, different types of TFTs (e.g., n-type or p-type) may be used so that sources and drains may be reversed in the example descriptions herein. Claimed subject matter is not limited in this respect. Also, embodiments are described herein as having rows and columns of conductive lines (e.g., 310 and 312). However, the descriptions may include a switch between "rows" and "columns" without affecting the nature of such descriptions. Claimed subject matter is not limited in this respect.

Figure 4:
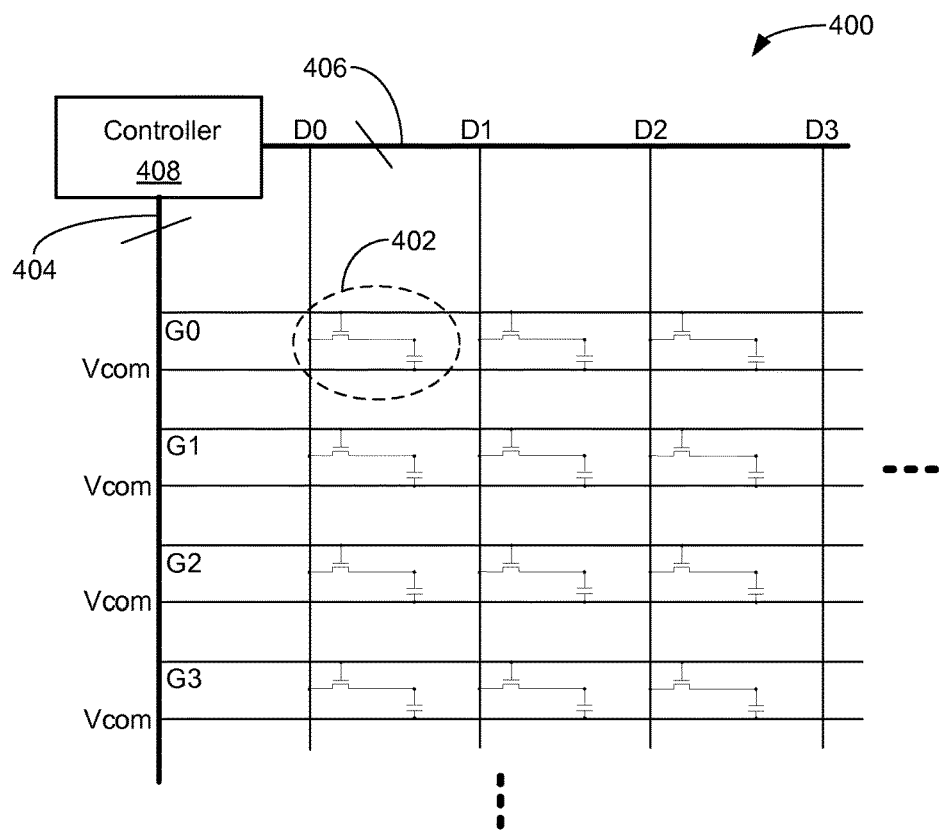
FIG. 4 is a schematic circuit diagram of a portion of an electrowetting pixel array of an electrowetting display device, according to various embodiments.

FIG. 4 is a schematic circuit diagram of a portion of an electrowetting display device 400, according to various embodiments. Electrowetting display device 400 includes a plurality of electrowetting elements 402 arranged in rows and columns of a matrix. For example, electrowetting display device 400 can include hundreds or thousands of such rows and columns of electrowetting elements 402. Electrowetting elements 402 may be similar to or the same as electrowetting elements 300 shown in FIG. 3. For sake of clarity, a storage capacitor of each electrowetting pixel, such as Cstorage illustrated in FIG. 3, is not included in FIG. 4. Electrowetting elements 402 are electrically connected in the matrix to rows of gate lines G0, G1, G2, G3 . . . , columns of data lines D0, D1, D2, D3 . . . , and rows of reset voltage lines Vcom. Though Vcom lines are shown as rows, Vcom lines may instead be aligned in columns or any other configuration, and claimed subject matter is not so limited. The gate lines, data lines, and reset voltage lines are electrically connected to a plurality of conductors (e.g., wires, conductive traces, and so on) represented by lines 404 and 406 in FIG. 4. Electrical signals (e.g., waveforms, voltage levels, and so on) are provided to the gate lines, data lines, and reset voltage lines by a controller 408 via lines 404 and 406. In particular, reset voltage lines Vcom are electrically tied together and set to the same voltage. Controller 408 may be a processor, a CPU, or an ASIC, just to name a few examples. Functions of controller 408 may be implemented by software, hardware, or both. Controller 408 can affect optical transmission of the electrowetting elements 402 by increasing or decreasing voltage on the data lines and by generating the reset signals, for example.

In particular, individual electrowetting elements 402 are electrically connected to (i) one of the data lines to provide a source signal to a TFT (e.g., TFT 306), (ii) one of the gate lines to provide a gate signal to the TFT, and (iii) one of the reset voltage lines to provide a reset voltage to the individual electrowetting element 402.

Figure 5:
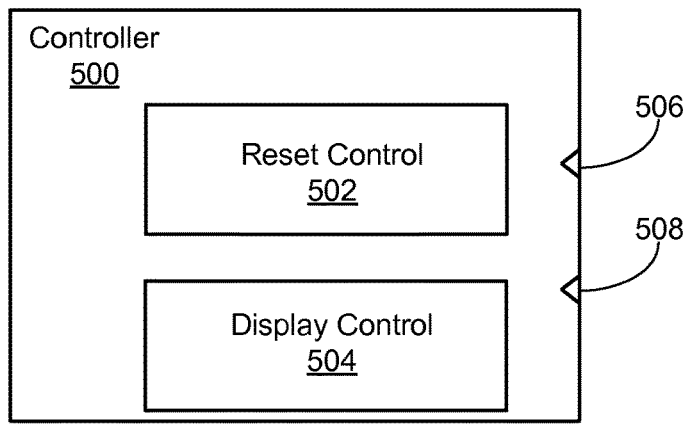
FIG. 5 is a block diagram of a controller for an electrowetting display device, according to various embodiments.

FIG. 5 is a block diagram of a controller 500 for an electrowetting display device, according to various embodiments. For example, controller 500 may be the same as or similar to controller 408 shown in FIG. 4. Controller 500 includes, among other things, a reset control block 502 and a display control block 504. Though shown as two separate blocks, reset control block 502 and display control block 504 may be separate or single electrical circuits or multiple circuits in a single package, code executable by one or more processors, or any combination thereof. For example, reset control 502 may comprise logic circuitry and/or a processor for executing code.

Reset control block 502 may be in electrical contact with the top electrode of the electrowetting display device. In some implementations, reset control block 502 may electrically connect to the top electrode via an output port 506, from where reset pulses may be provided to the electrowetting display device from controller 500. For example, such a top electrode may be the same as or similar to top electrode 120 (FIG. 1) or Vcom 304 (FIG. 3). Via the top electrode, reset control block 502 may provide in unison a reset pulse to substantially all (or any portion thereof) pixels of the electrowetting display device, such as the rows and columns of the electrowetting elements 402 shown in FIG. 4. In other words, instead of providing a reset pulse to one pixel at a time or one row or column at a time, reset control block 502 may provide a reset pulse to substantially all pixels of a display device at the same time. In other implementations, reset control block 502 may provide a reset pulse to multiple portions (e.g., blocks, a plurality of rows and/or columns, and so on) at the same time. In yet other implementations, reset control block 502 may provide a reset pulse simultaneously to substantially all pixels of a display device, via a top electrode, that are in electrical contact with the top electrode.

In some particular embodiments, a pixel of an electrowetting display device may be in an on-state if a voltage from the bottom electrode to the top electrode of the electrowetting pixel is a negative value. On the other hand, the electrowetting pixel may be in an off-state if the voltage from the bottom electrode to the top electrode of the electrowetting pixel is a positive value. For example, the negative value of the on-state may be approximately −15 volts and the positive value of the off-state may be approximately 15 volts.

The reset pulse may at least momentarily set the voltage from the bottom electrode to the top electrode of the electrowetting pixels to a particular positive value, regardless of the state of the electrowetting pixels. For example, the particular positive value set by the reset pulse may be approximately 17 volts. The voltage of the reset pulse on the top electrode may be approximately −32 volts. In some implementations, the reset pulse may be a square pulse, a sawtooth pulse, or a triangular pulse, just to name a few examples. Of course, such voltage values are merely examples, and claimed subject matter is not so limited.

Display control block 504 may be in electrical contact with gate lines and data lines, such as gate lines G0, G1, G2 . . . and data lines D0, D1, D2 . . . , as shown in FIG. 4. Gate lines and data lines electrically connect to individual pixels of the electrowetting display device. In some implementations, display control block 504 may electrically connect to the gate lines and the data lines via an output port 508, from where control signals may be provided to the electrowetting display device from controller 500.

Figure 6:
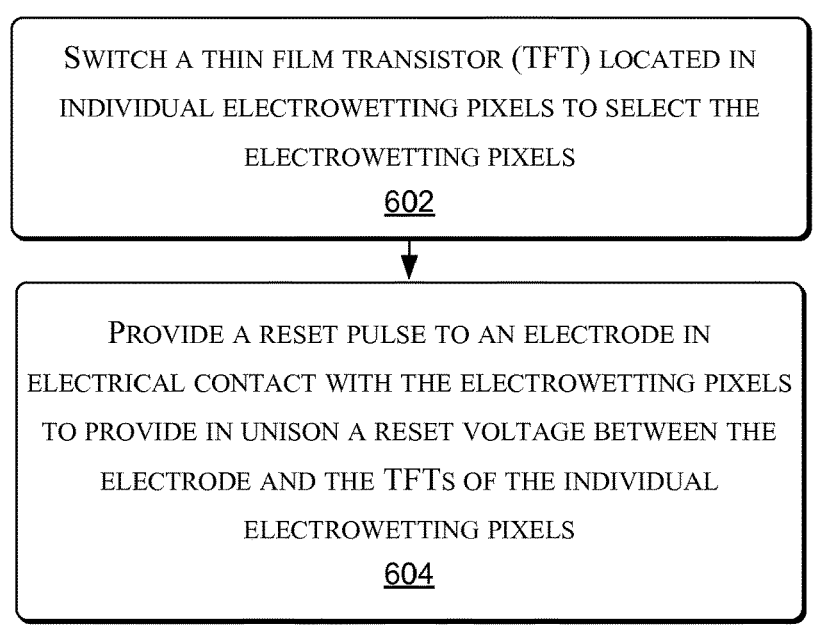
FIG. 6 is a flow diagram of a process for operating an electrowetting display device, according to various example embodiments.

FIG. 6 is a flow diagram of a process 600 for operating an electrowetting display device, according to various example embodiments. For example, such an electrowetting display device may include electrowetting elements such as 100 or 302 shown in FIGS. 1 and 3, respectively. Process 600 may be performed by controller 408 or one or more processors (e.g., processor(s) 710, shown in FIG. 7), for example. Process 600 is described as being performed by controller 408.

At block 602, controller 408 switches a TFT located in individual electrowetting pixels to select the electrowetting pixels. For example, display control block 504 may generate electrical signals that are provided, via output port 508, to the gate of the TFT (e.g., TFT 306 shown in FIG. 3). In a particular implementation, the gate of the TFT may be set from ground voltage to a relatively high (e.g., about 5 volts) voltage to place the TFT in a conductive state (e.g., thus switching the TFT).

At block 604, controller 408 provides a reset pulse to an electrode in electrical contact with the electrowetting pixels to provide in unison a reset voltage between the electrode and the TFTs of the individual electrowetting pixels. For example, the voltage may be across an electrolyte solution of the electrowetting display device. The electrolyte solution and the electrode may be the same as or similar to second fluid 114 and top electrode layer 120 shown in the example embodiment in FIG. 1, though claimed subject matter is not limited in this respect.

Figure 7:
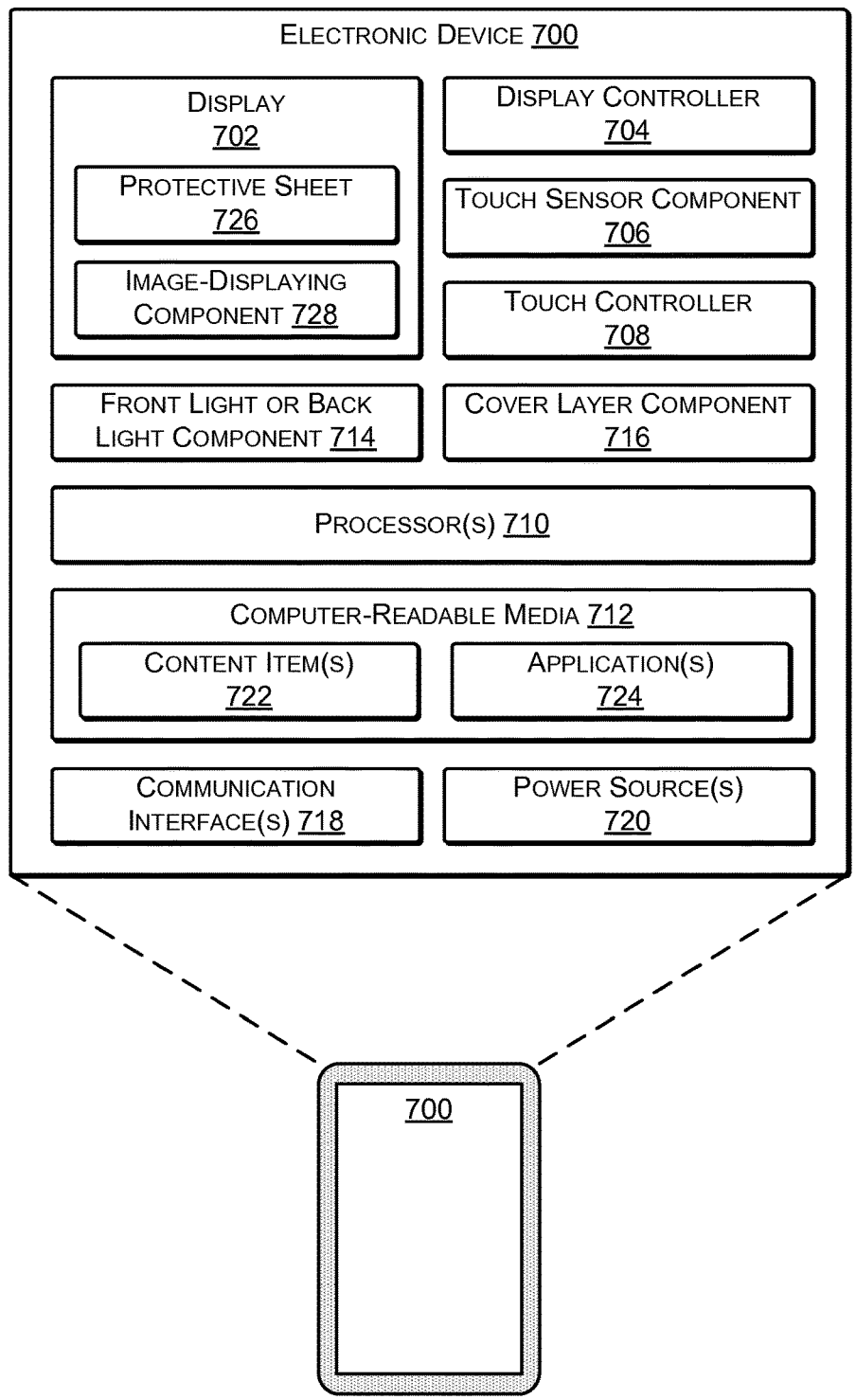
FIG. 7 illustrates an example electronic device that may incorporate a display device, according to some embodiments.

FIG. 7 illustrates an example electronic device 700 that may incorporate any of the display devices discussed above. The device 700 may comprise any type of electronic device having a display. For instance, the device 700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 700 may be a non-mobile electronic device (e.g., a computer display, a television, etc.). In addition, while FIG. 7 illustrates several example components of the electronic device 700, it is to be appreciated that the device 700 may also include other conventional components, such as an operating system, system busses, input/output components, and the like. Further, in other examples, such as in the case of a television or computer monitor, the electronic device 700 may only include a subset of the components illustrated.

Regardless of the specific implementation of the electronic device 700, the device 700 includes a display 702 and a corresponding display controller 704. The display 702 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 702 that may be used with the implementations described herein include bi-stable LCD displays, micro electromechanical system (MEMS) displays, such as interferometric modulator displays, cholesteric displays, electrophoretic displays, electro-fluidic pixel displays, electrowetting displays, photonic ink displays, gyricon displays, and the like. In other implementations, or for other types of devices 700, the display 702 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 702 may represent a backlit display, examples of which are mentioned above.

In addition to including the display 702, FIG. 7 illustrates that some examples of the device 700 may include a touch sensor component 706 and a touch controller 708. In some instances, at least one touch sensor component 706 resides with, or is stacked on, the display 702 to form a touch-sensitive display (e.g., an electronic paper touch-sensitive display). Thus, the display 702 may be capable of both accepting user touch input and rendering content in response to or corresponding to the touch input. As several examples, the touch sensor component 706 may comprise a capacitive touch sensor, a force sensitive resistance (FSR), an interpolating force sensitive resistance (IFSR) sensor, or any other type of touch sensor. In some instances, the touch sensor component 706 is capable of detecting touches as well as determining an amount of pressure or force of these touches.

FIG. 7 further illustrates that the electronic device 700 may include one or more processors 710 and one or more computer-readable media 712, as well as a front light component 714 (which may alternatively be a backlight component in the case of a backlit display) for lighting the display 702, a cover layer component 716, such as a cover glass or cover sheet, one or more communication interfaces 718 and one or more power sources 720. The communication interfaces 718 may support both wired and wireless connection to various networks, such as cellular networks, radio, WiFi networks, short range networks (e.g., Bluetooth®), infrared (IR), and so forth.

Depending on the configuration of the electronic device 700, the computer-readable media 712 (and other computer-readable media described throughout) is an example of computer storage media and may include volatile and non-volatile memory. Thus, the computer-readable media 712 may include, but is not limited to, RAM, ROM, EEPROM, flash memory, or other memory technology, or any other medium that may be used to store computer-readable instructions, programs, applications, media items, and/or data which may be accessed by the electronic device 700.

The computer-readable media 712 may be used to store any number of functional components that are executable on the processor 710, as well as content items 722 and applications 724. Thus, the computer-readable media 712 may include an operating system and a storage database to store one or more content items 722, such as eBooks, audio books, songs, videos, still images, and the like. The computer-readable media 712 of the electronic device 700 may also store one or more content presentation applications to render content items on the device 700. These content presentation applications may be implemented as various applications 724 depending upon the content items 722. For instance, the content presentation application may be an electronic book reader application for rending textual electronic books, an audio player for playing audio books or songs, a video player for playing video, and so forth.

In some instances, the electronic device 700 may couple to a cover (not illustrated in FIG. 7) to protect the display (and other components in the display stack or display assembly) of the device 700. In one example, the cover may include a back flap that covers a back portion of the device 700 and a front flap that covers the display 702 and the other components in the stack. The device 700 and/or the cover may include a sensor (e.g., a Hall Effect sensor) to detect if the cover is open (i.e., if the front flap is not atop the display and other components). The sensor may send a signal to the front light component 714 if the cover is open and, in response, the front light component 714 may illuminate the display 702. If the cover is closed, meanwhile, the front light component 714 may receive a signal indicating that the cover has closed and, in response, the front light component 714 may turn off.

Furthermore, the amount of light emitted by the front light component 714 may vary. For instance, upon a user opening the cover, the light from the front light may gradually increase to its full illumination. In some instances, the device 700 includes an ambient light sensor (not illustrated in FIG. 7) and the amount of illumination of the front light component 714 may be based at least in part on the amount of ambient light detected by the ambient light sensor. For example, the front light component 714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 702 may vary depending on whether the front light component 714 is on or off, or based on the amount of light provided by the front light component 714. For instance, the electronic device 700 may implement a larger default font or a greater contrast if the light is off compared to if the light is on. In some instances, the electronic device 700 maintains, if the light is on, a contrast ratio for the display that is within a certain defined percentage of the contrast ratio if the light is off.

As described above, the touch sensor component 706 may comprise a capacitive touch sensor that resides atop the display 702. In some examples, the touch sensor component 706 may be formed on or integrated with the cover layer component 716. In other examples, the touch sensor component 706 may be a separate component in the stack of the display assembly. The front light component 714 may reside atop or below the touch sensor component 706. In some instances, either the touch sensor component 706 or the front light component 714 is coupled to a top surface of a protective sheet 726 of the display 702. As one example, the front light component 714 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards the display 702, thus illuminating the display 702.

The cover layer component 716 may include a transparent substrate or sheet having an outer layer that functions to reduce at least one of glare or reflection of ambient light incident on the electronic device 700. In some instances, the cover layer component 716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3$h$ pencil). Without such scratch resistance, a device may be more easily scratched and a user may perceive the scratches from the light that is dispersed over the top of the reflective display. In some examples, the protective sheet 726 may include a similar UV-cured hard coating on the outer surface. The cover layer component 716 may couple to another component or to the protective sheet 726 of the display 702. The cover layer component 716 may, in some instances, also include a UV filter, a UV-absorbing dye, or the like, for protecting components lower in the stack from UV light incident on the electronic device 700. In still other examples, the cover layer component 716 may include a sheet of high-strength glass having an antiglare and/or antireflective coating.

The display 702 includes the protective sheet 726 overlying an image-displaying component 728. For example, the display 702 may be preassembled to have the protective sheet 726 as an outer surface on the upper or image-viewing side of the display 702. Accordingly, the protective sheet 726 may be integral with and may overlie the image-displaying component 728. The protective sheet 726 may be optically transparent to enable a user to view, through the protective sheet 726, an image presented on the image-displaying component 728 of the display 702.

In some examples, the protective sheet 726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 726 may include a coating, such as the hard coating described above. For instance, the hard coating may be applied to the outer surface of the protective sheet 726 before or after assembly of the protective sheet 726 with the image-displaying component 728 of the display 702. In some examples, the hard coating may include a photoinitiator or other reactive species in its composition, such as for curing the hard coating on the protective sheet 726. Furthermore, in some examples, the protective sheet 726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 726, thereby protecting the image-displaying component 728 from UV light.

According to some implementations herein, one or more of the components discussed above may be coupled to the display 702 using fluid optically-clear adhesive (LOCA). For example, suppose that the light guide portion of the front light component 714 is to be coupled to the display 702. The light guide may be coupled to the display 702 by placing the LOCA on the outer or upper surface of the protective sheet 726. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 714. In other implementations, the LOCA may be placed near a center of the protective sheet 726, and pressed outwards towards a perimeter of the top surface of the protective sheet 726 by placing the front light component 714 on top of the LOCA. The LOCA may then be cured by directing UV light through the front light component 714. As discussed above, and as discussed additionally below, various techniques, such as surface treatment of the protective sheet, may be used to prevent discoloration of the LOCA and/or the protective sheet 726.

While FIG. 7 illustrates a few example components, the electronic device 700 may have additional features or functionality. For example, the device 700 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 700 may reside remotely from the device 700 in some implementations. In these implementations, the device 700 may utilize the communication interfaces 718 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a bottom support plate;
   a top support plate positioned above the bottom support plate and substantially parallel to the bottom support plate, wherein a space between the bottom support plate and the top support plate comprises:
      a plurality of pixel regions for presenting content, each of the plurality of pixel regions comprising a respective portion of an electrolyte solution, wherein a pixel region of the plurality of pixel regions comprises:
         a bottom electrode on the bottom support plate;
         a hydrophobic layer portion on the bottom support plate;
         an electrowetting oil on the hydrophobic layer portion, wherein the electrowetting oil is immiscible with the electrolyte solution; and
         a thin film transistor (TFT) connected to the bottom electrode;
      a top electrode on the top support plate and in electrical contact with the respective portion of the electrolyte solution of each of the plurality of pixel regions, wherein the respective portion of the electrolyte solution of each of the plurality of pixel regions is at least partially between the top electrode and the bottom support plate;
      a gate line in electrical contact with a gate of the TFT of the pixel region, to provide a gate signal to switch the TFT to a conductive state; and
      a data line in electrical contact with one of (i) a source or (ii) a drain of the TFT of the pixel region, to provide a potential to the bottom electrode, different from a potential applied to the top electrode, with the TFT in the conductive state, so as to place the pixel region in an active state in which both the electrowetting oil and the electrolyte solution contact the hydrophobic layer portion; and
   reset control circuitry in electrical contact with the top electrode, wherein the reset control circuitry is configured to change the potential applied to the top electrode so as to provide a global reset voltage pulse to the plurality of pixel regions.

2. The electrowetting display device of claim 1, wherein the source of the TFT of the pixel region is in electrical contact with the data line to provide a source signal to the TFT.

3. The electrowetting display device of claim 1, wherein the top electrode comprises tin-doped indium-oxide (ITO) conductive traces on the top support plate, wherein the ITO conductive traces cover at least a portion of each of the plurality of pixel regions.

4. The electrowetting display device of claim 1, wherein the reset control circuitry is further configured to change the potential applied to the top electrode to be greater than a potential applied to the bottom electrode of the pixel region, irrespective of whether the pixel region is in the active state, so as to provide the global reset voltage pulse to the plurality of pixel regions.

5. The electrowetting display device of claim 1, further comprising a reset voltage line in electrical contact with the top electrode, wherein the reset voltage line is different from the data line, and wherein the reset control circuitry is configured to change the potential applied to the top electrode by changing a potential applied to the reset voltage line.

6. An electrowetting display device comprising:
   a first support plate;
   a second support plate;
   pixels arranged in rows and columns, each of the pixels comprising a respective portion of an electrolyte solution, wherein a pixel of the pixels comprises:
      a first electrode on the first support plate;
      a hydrophobic layer portion on the first electrode;
      a thin film transistor (TFT) in electrical contact with the first electrode; and
      an oil at least partially on the hydrophobic layer portion;
   a second electrode on the second support plate and in electrical contact with the rows and columns of the pixels via the electrolyte solution, wherein the electrolyte solution is at least partially between the second electrode and the first support plate; and
   control circuitry to control: (i) a potential applied to a drain or a source of the TFT of the pixel to provide a potential to the first electrode, different from a potential applied to the second electrode, so as to place the pixel in an active state in which both the oil and the electrolyte solution contact the hydrophobic layer portion; and (ii) the potential applied to the second electrode,
   wherein the control circuitry is configured to change the potential applied to the second electrode so as to provide a global reset voltage pulse to the pixels.

7. The electrowetting display device of claim 6, further comprising:
   a data line in electrical contact with one of (i) the source or (ii) the drain of the TFT of the pixel; and
   a gate line in electrical contact with a gate of the TFT of the pixel.

8. The electrowetting display device of claim 7, wherein each of the pixels is in electrical contact with the data line and the gate line, and wherein the control circuitry is capable of providing (i) a source signal to the TFT via the data line and (ii) a gate signal to the TFT via the gate line.

9. The electrowetting display device of claim 7, further comprising:
   display control circuitry capable of increasing or decreasing a display potential applied to the data line.

10. The electrowetting display device of claim 7, further comprising a plurality of electrically interconnected reset voltage lines that are in electrical contact with the second electrode, wherein the control circuitry is configured to change a potential applied to the reset voltage lines so as to provide the global reset voltage pulse to the pixels.

11. The electrowetting display device of claim 6, wherein the second electrode comprises tin-doped indium-oxide (ITO).

12. The electrowetting display device of claim 6, wherein the electrolyte solution is in electrical contact with the second electrode.

13. The electrowetting display device of claim 6, wherein the control circuitry is further configured to set the potential applied to the second electrode to be greater than the potential applied to the first electrode, irrespective of whether the pixel is in the active state, so as to provide the global reset voltage pulse to the pixels.

14. The electrowetting display device of claim 6, wherein the global reset voltage pulse comprises at least one of a square pulse, a sawtooth pulse, or a triangular pulse.

15. The electrowetting display device of claim 6, wherein the global reset voltage pulse is arranged to substantially simultaneously reduce backflow of the oil in the pixels for a time span of less than about 1 millisecond.

16. A method for operating an electrowetting display device, the method comprising:
   providing a gate signal via a gate line to a gate of a thin film transistor (TFT) of a pixel of the electrowetting display device to switch the TFT to a conductive state, the pixel comprising a first electrode on a first support plate, the first electrode connected to the TFT;
   generating a potential to be applied to the first electrode via a data line in electrical contact with one of (i) a source or (ii) a drain of the TFT;
   applying the potential to the first electrode, with the TFT in the conductive state, to place the pixel in an active state, the potential applied to the first electrode different from a potential applied to a second electrode on a second support plate of the pixel, the second electrode in electrical contact with a respective portion of an electrolyte solution of a plurality of pixels, the plurality of pixels comprising the pixel, wherein the electrolyte solution is between the first support plate and the second support plate, and the electrolyte solution is at least partially between the second electrode and the first support plate;
   generating a further potential to be applied to the second electrode; and
   applying the further potential to the second electrode to change a voltage between the first electrode and the second electrode so as to provide a global reset voltage pulse to the plurality of pixels.

17. The method of claim 16, wherein the first electrode is electrically connected to one of the source or the drain of the TFT.

18. The method of claim 16, wherein the TFT is located in the first support plate.

19. The method of claim 16, further comprising generating the further potential with a magnitude so that the voltage between the first electrode and the second electrode during provision of the global reset voltage pulse has a positive value.

20. The method of claim 16, wherein the applying the further potential to the second electrode comprises applying the further potential to the second electrode via a reset voltage line electrically connected to the second electrode, the reset voltage line different from the data line.

* * * * *